United States Patent
Cech et al.

(10) Patent No.: US 8,282,163 B2
(45) Date of Patent: Oct. 9, 2012

(54) SEATING SYSTEM FOR MASS TRANSIT VEHICLE

(75) Inventors: Leonard S. Cech, Brighton, MI (US); James D. Baal, Novi, MI (US); Scott Kerby, Wolverine Lake, MI (US); Dennis S. Rumps, Wolverine Lake, MI (US)

(73) Assignee: TK Holdings Inc., Auburn Hills, MI (US)

( * ) Notice: Subject to any disclaimer, the term of this patent is extended or adjusted under 35 U.S.C. 154(b) by 288 days.

(21) Appl. No.: 12/715,812

(22) Filed: Mar. 2, 2010

(65) Prior Publication Data

US 2011/0215620 A1    Sep. 8, 2011

(51) Int. Cl.
*A47C 7/62*    (2006.01)
*A47C 7/72*    (2006.01)
*B60R 22/48*   (2006.01)
*B60Q 1/00*    (2006.01)

(52) U.S. Cl. .................. 297/217.3; 297/217.2; 297/468; 340/457.1

(58) Field of Classification Search ............... 297/217.3, 297/468, 217.2; 340/457.1; 701/45; 709/204
See application file for complete search history.

(56) References Cited

U.S. PATENT DOCUMENTS

| | | | |
|---|---|---|---|
| 3,074,055 A | 1/1963 | Rudolph et al. | |
| 3,351,381 A | 11/1967 | Boblitz | |
| 3,875,556 A | 4/1975 | Beaird | |
| 4,849,733 A | 7/1989 | Conigliaro et al. | |
| 5,555,458 A | 9/1996 | Large | |
| 5,877,707 A | 3/1999 | Kowalick | |
| 6,204,757 B1 | 3/2001 | Evans et al. | |
| 6,215,395 B1 | 4/2001 | Slaughter et al. | |
| 6,321,151 B1 * | 11/2001 | Shultz | 701/31.5 |
| 6,362,734 B1 | 3/2002 | McQuade et al. | |
| 6,448,907 B1 | 9/2002 | Naclerio | |
| 6,545,597 B1 | 4/2003 | Blount | |
| 6,888,475 B2 | 5/2005 | Darr | |
| 6,992,566 B2 | 1/2006 | Striemer | |
| 7,199,703 B2 | 4/2007 | Okita et al. | |
| 7,209,033 B2 | 4/2007 | Hofbeck et al. | |
| 7,262,696 B2 | 8/2007 | Aota et al. | |
| 7,636,236 B1 * | 12/2009 | Nana | 361/679.26 |
| 2005/0061568 A1 | 3/2005 | Schondorf et al. | |
| 2005/0062595 A1 | 3/2005 | Hofbeck et al. | |
| 2006/0139159 A1 | 6/2006 | Lee et al. | |
| 2006/0163430 A1 | 7/2006 | Cordina et al. | |
| 2006/0180647 A1 | 8/2006 | Hansen | |
| 2007/0132288 A1 * | 6/2007 | Zuzga et al. | 297/217.3 |
| 2007/0222572 A1 | 9/2007 | Downey et al. | |

* cited by examiner

*Primary Examiner* — Milton Nelson, Jr.
(74) *Attorney, Agent, or Firm* — Foley & Lardner LLP

(57) ABSTRACT

A seat system for a mass transit vehicle configured to provide at least one seating position, which includes a seat cushion configured to support at least one occupant; a seat back configured to support at least one occupant; one seat belt device for each seating position configured to provide restraint to an occupant, which includes a first sensing mechanism to detect and output a first signal indicating whether the seat belt device is configured in one of two positions, a first unbuckled position and a second buckled position; an electronic control unit, coupled to a vehicle voltage source, having at least one input connection, at least one output connection, a microprocessor to process data received through any input connection, and a memory device to store data processed by the microprocessor; at least one communication means coupled to the electronic control unit for communicating externally to the seat system; and a second sensing mechanism to determine whether the seat is configured in one of two positions, a first unoccupied position and a second occupied position.

29 Claims, 3 Drawing Sheets

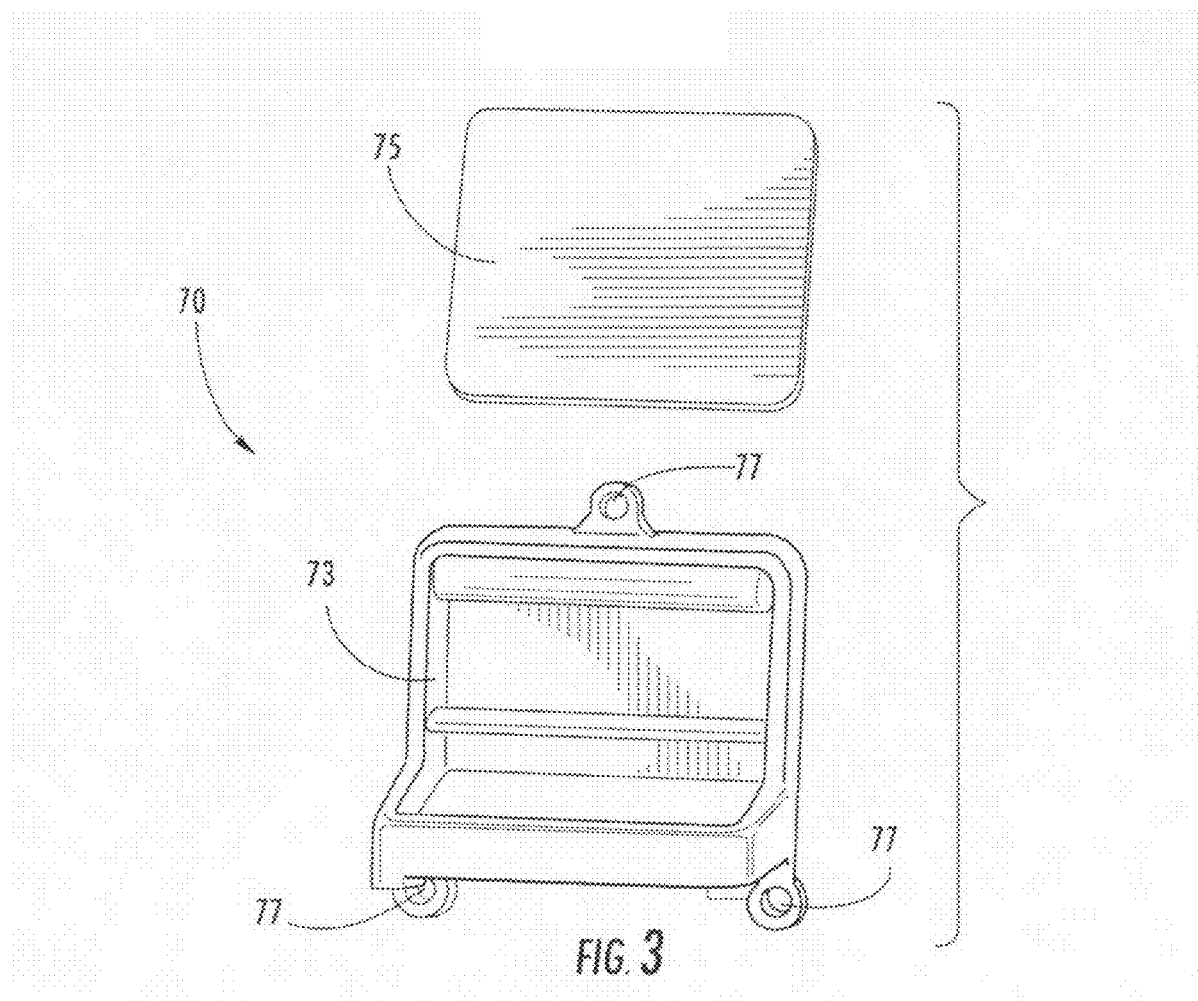
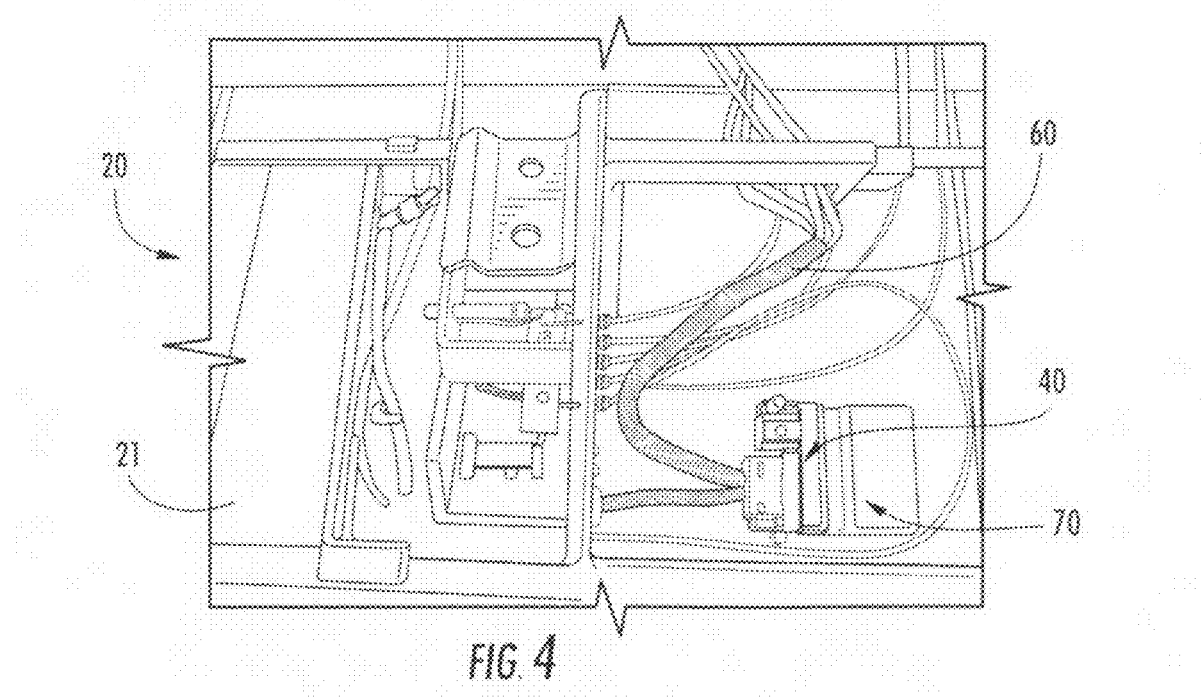

SEATING SYSTEM FOR MASS TRANSIT VEHICLE

BACKGROUND

The present application relates generally to the field of electromechanical devices in motor vehicles, and more specifically relates to electromechanical devices in mass transit vehicles for routing power between the vehicle and seat and for providing power to and communication to and from electronic devices in the vehicle.

SUMMARY

One embodiment of the application relates to a seat system for use in a mass transit vehicle, which is configured to provide at least one seating position. The seat system may include a seat cushion configured to support at least one occupant, a seat back configured to support at least one occupant, one seat belt device for each seating position configured to provide restraint to the occupant, and an electronic control unit coupled to a vehicle voltage source. Each seat belt device may include a webbing, a buckle mechanism, a tongue mechanism to detachably couple to the buckle mechanism, and a first sensing mechanism to detect and output a first signal indicating whether the seat belt device is configured in one of two positions, a first unbuckled position and a second buckled position. The electronic control unit may include at least one input connection, at least one output connection, a microprocessor to process data received through any input connection, and a memory device to store data processed by the microprocessor. The seat system may further include at least one communication means coupled to the electronic control unit for communicating externally to the seat system and a second sensing mechanism to determine whether the seat is configured in one of two positions, a first unoccupied position and a second occupied position. The second sensing mechanism may output a second signal as to the configured position of the seat. The microprocessor may be configured to monitor the first and second signals, and the memory device may be configured to record the first and second signals.

The seat system may further include a third sensing mechanism, a fourth sensing mechanism, a fifth sensing mechanism, a sixth sensing mechanism, and a seventh sensing mechanism. The third sensing mechanism may be configured to determine the weight of the occupant when the second sensing mechanism determines the seat to be in the second occupied position and to output a third signal as to the weight of the occupant. The fourth sensing mechanism may be configured to detect the position and size of the occupant and to output a fourth signal as to position and size of the occupant. The fifth sensing mechanism may be configured to detect motion of the occupant and to output a fifth signal as to motion of the occupant. The sixth sensing mechanism may be configured to detect the identification of the occupant and to output a sixth signal as to the identification of the occupant. The seventh sensing mechanism may be configured to detect the inertia of the seat system and to output a seventh signal as to the inertia of the seat system. The microprocessor may monitor the third signal from the third sensing mechanism, the fourth signal from the fourth sensing mechanism, the fifth signal from the fifth sensing mechanism, the sixth signal from the sixth sensing mechanism, and the seventh signal from the seventh sensing mechanism. The memory device may record the third signal from the third sensing mechanism, the fourth signal from the fourth sensing mechanism, the fifth signal from the fifth sensing mechanism, the sixth signal from the sixth sensing mechanism, and the seventh signal from the seventh sensing mechanism.

The seat system may further include a backup voltage source, which may include a battery or at least one capacitor, to supply voltage when the vehicle voltage source is not operable. The communication means of the seat system may include a direct connection to a communication protocol or a wireless connection to a communication protocol. The input and/or output connections may communicate with another vehicle electronic device, and the output connection may be configured to provide audio and/or video connection to the seat occupant. The seat belt device of the seat system may further include a lighting element, such as an electroluminescent light, which may be configured to provide light when the external lights of the vehicle are illuminated and/or when the tongue mechanism and buckle mechanism are uncoupled. The seat belt device may further include an active release mechanism to allow for remote uncoupling of the tongue mechanism from the buckle mechanism.

Another embodiment of the application relates to an electromechanical device for use within a seat system of a mass transit vehicle that is coupled to a vehicle voltage source. The electromechanical device may include at least one input connection to communicate with another electrical device, at least one output connection to communicate with another electrical device, a microprocessor to process data received through the input connection, and a memory device to store the data processed by the microprocessor. The output connection may further provide voltage to power the electrical device coupled to the output connection. The electromechanical device may further include at least one communication means for wirelessly communicating with another electrical device.

BRIEF DESCRIPTION OF THE DRAWINGS

FIG. 3 is a an exemplary embodiment of a cover for use with an electromechanical device, such as the electromechanical device of FIG. 2.

FIG. 4 is a perspective view of the electromechanical device of FIG. 2 configured integrated in a seat assembly, such as the seat assembly of FIG. 1.

DETAILED DESCRIPTION

A mass transit vehicle may be configured to include a centrally located or co-located device that provides for consolidation of power, control, and communication, related to a seat of the vehicle. Such a device may provide for power and signal conditioning of current functions and future functions of the seat, including digital and/or analog input sensors and digital and/or analog output actuators. A seat system may include a single interface for sensors, actuators, and data exchange with wireless electronic devices in the seat or those brought into proximity with the seat. A seating system that includes such a device would reduce cost associated with having multiple independent devices to communicate and control each sensor, actuator or communication exchange device. Such a configured device could also coordinate and control multiple simultaneous functions, such as safety related functions, to improve performance or efficiency.

Figure 1:
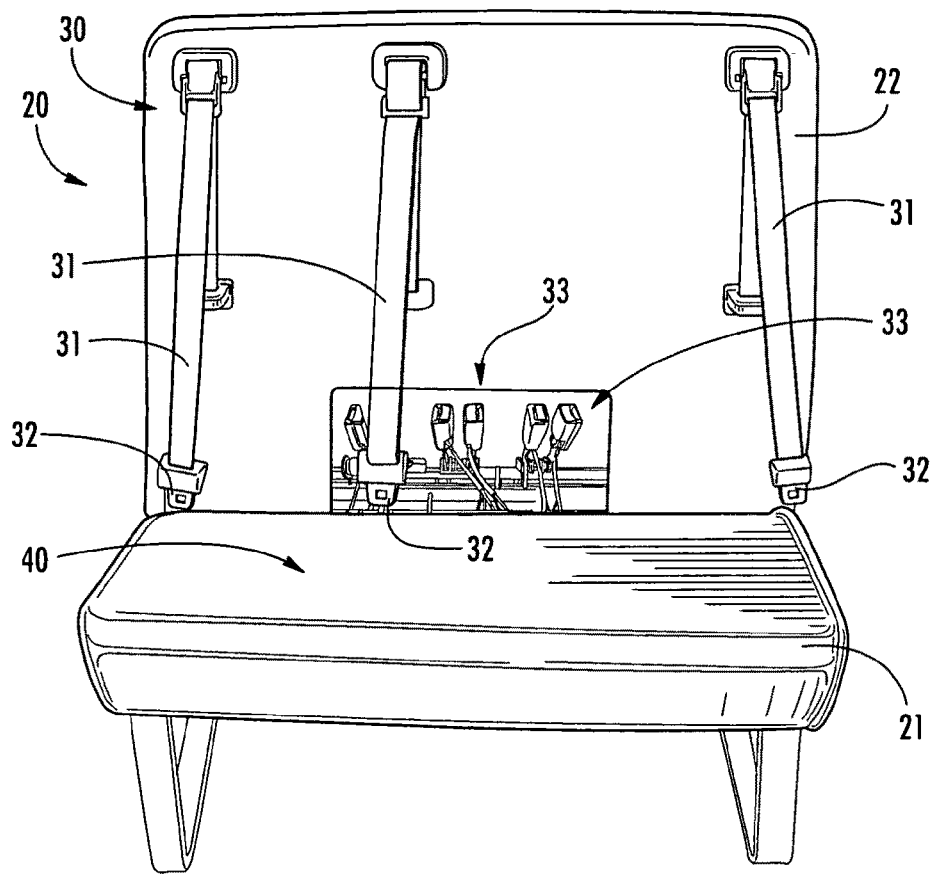
FIG. 1 is a front perspective view of an exemplary embodiment of a seat assembly.

Referring to FIG. 1, a seat system 20 is illustrated according to an exemplary embodiment for use in a mass transit vehicle (e.g., school bus, city bus, train, tram, plain) to provide seating for more than one occupant. The seat systems disclosed herein may be configured for use in seat systems that provide seating to one occupant or more than one occupant. It will also be recognized that the seat systems disclosed herein may be configured for use in any type of seat system (e.g., bucket, bench). Furthermore, the seat system may be configured to function as part of an overall vehicle seating system that may include multiple individual seat systems.

Seat system 20 includes a seat cushion 21 configured to support at least one occupant, a seat back 22 configured to support at least one occupant, one seat belt device 30 for each seating position to provide active restraint to an occupant, and an electronic control unit (ECU) 40. The seat cushion 21 and the seat back 22 may be configured using known methods to provide comfort and durability. For example, the seat back and seat cushion may be configured to provide for long operational life even when exposed to water and other liquids, high and low temperatures, high numbers of occupant ingress and egress, and other environmental and human factors that a mass transit vehicle is subjected to.

Seat belt device 30 includes a webbing 31, which may be made of conventional high-strength webbing material, a buckle mechanism 33 configured using known methods, and a tongue mechanism 32 configured using known methods, where the tongue mechanism 32 may be coupled along the webbing and may be detachably coupled to the buckle mechanism 33 using conventional methods. Seat belt device 30 is configured for use in a first position and a second position. The first position, or non-use position, is when the tongue mechanism 32 is uncoupled with the buckle mechanism 33, where the seat belt device 30 does not provide active restraint to an occupant seated on seat system 20. The second position, or use-position, is when the tongue mechanism 32 is coupled to the buckle mechanism 33, where the seat belt device 30 provides active restraint to an occupant seated on seat system 20 and restricted by the webbing 31.

Seat belt device 30 further includes a first sensing mechanism configured to detect whether seat belt device 30 is configured in its first position (i.e., non-use or unbuckled position) or its second position (i.e., use or buckled position), then output a first signal to communicate to the ECU 40 the status (or position) the seat belt device 30 is configured in. According to an exemplary embodiment, the first signal may be communicated through a direct wire connection communication protocol, such as CAN, LIN, USB, or Serial. According to another exemplary embodiment, the first signal may be communicated through a wireless connection communication protocol, such as radio frequency identification (RFID), Bluetooth, or WiFi. First sensing mechanism may provide the ECU 40 with information determining seat belt usage by an occupant over a period of time. A seat system may include more than one seat belt device, where each seat belt device may include a first sensing mechanism that communicates buckle usage and non-usage for that specific seat belt device with the ECU. For example, as shown in FIG. 1, seat system 20 includes three seat belt devices 30, where each seat belt device 30 includes one first sensing mechanism that communicates independently with ECU 40.

According to an exemplary embodiment, ECU 40 may be connected to the seat belt device 30 through a coupled wiring harness 60 to provide the voltage and power to the first sensing mechanism. A seat belt device may further include a lighting element that is provided power by the same coupled wiring harness with the ECU that provides power to the first sensing mechanism. According to an exemplary embodiment, lighting element may be an electroluminescent light buckle mechanism which may be enabled to provide light when the lights of the vehicle are illuminated and/or when the buckle mechanism and tongue mechanism are uncoupled or unbuckled. A seat belt device may further include an active release mechanism which may also be provided power by the same coupling with the ECU that provides power to the seat belt mechanism. According to an exemplary embodiment, active release mechanism includes a solenoid, which may be activated remotely by a switch proximate to the driver of the mass transit vehicle. Activation of the switch triggers actuation of the actuator (e.g., solenoid, motor, stored energy reservoir), which may release or uncouple the tongue mechanism from the buckle mechanism. Each seat belt device in each seat system of the mass transit vehicle may be coupled to or wirelessly activated by a remote activation switch, so that in case of emergency, the driver may decouple all the vehicle passengers at substantially the same time.

The ECU 40 includes a microprocessor 41, a memory device 42, at least one input connection 45, and at least one output connection 46. The ECU 40 may be coupled to a vehicle power source through an input connection 45, which is configured to provide the primary power supply to ECU 40 and accordingly to the seat system 20. According to an exemplary embodiment, the output connection 46 may be configured to provide voltage or power to other electric devices, such as providing power to sensing mechanisms, actuators, or to other electrical devices. According to another exemplary embodiment, the output connection 46 may be configured to provide communication, through any format or communication protocol, to other electronic devices in the seat system 20. Those skilled in the art will recognize that input and output connections of the ECU may be combined into one connector device having multiple connections so that the ECU may provide power and communication to another electronic device.

An ECU may include any number of output and/or input connections to allow for communication to and from any number of electronic devices in the seat system (e.g., sensors) and/or any number of electronic devices external to the seat system in the vehicle (e.g., passive occupant protection devices). These communication connections of the ECU may be configured for any format or communication protocol and may be used for both sending data to and receiving data from other electronic devices, such as, but not limited to seat sensors, actuators, video, and audio data. For example, the ECU may also provide power to and communication to and from seat actuators, such as adjuster switches for track mechanisms, recliner mechanisms, or bolster mechanisms. Additionally, the ECU may provide power and communication to other seat system features, such as lights, warning devices, video, and audio devices.

The ECU 40 may further include a communication means to provide communication to and from electronic devices external to the seat system 20. According to an exemplary embodiment, communication means may be directly connected through an input connection and/or output connection to an electronic device external to the seat system 20 to provide communication through any format or communication protocol. According to another exemplary embodiment, a communication means may be wirelessly connected to an electronic device external to the seat system 20 to provide communication through any format or communication protocol. For example a mass transit vehicle having multiple rows of seat systems may have one central control module that may communicate through the communication means with each seat system to alert the driver of the bus as to which specific occupants are unbuckled. Those skilled in the art will recognize that the communication means disclosed herein may send and receive any type of information from each seat system and is not limited to that of seat belt usage. Additionally, the communication means as disclosed herein is not limited to communication with the vehicle that includes the communication means, and the communication means may be used to communicate with any other vehicle, a bus station, paramedics, or any other electronic device configured to send and/or receive information with the communication means.

The microprocessor 41 processes through conventional methods information that is input through a direct coupling into or received through a wireless connection by the ECU 40 or from other electronic devices in the seat system 20 or other electronic devices in the vehicle. For example, the first signal from the first sensing mechanism specifying the position the seat belt device 30 is configured in, or any other signal from any other electronic device may be received by or input into the ECU 40 and processed by the microprocessor 41. The memory device 42 records and stores through conventional methods the information processed by the microprocessor 41, so that the information can be retrieved later. For example, the microprocessor 41 may process and the memory device 42 may store seat belt usage information of an occupant provided by first sensing mechanism, which may be later retrieved by a safety official (or another person) to evaluate seat belt usage (or non-usage) by an occupant injured during a dynamic impact event of the mass transit vehicle. The ECU 40 may process additional information as disclosed herein and is not limited to seat belt usage of the seat occupants.

The seat system 20 may further include a backup power supply, to provide power to the seat system 20 in the event the primary power supply becomes inoperable or disconnected with the seat system 20 or the ECU 40. According to an exemplary embodiment, seat system 20 may include a battery backup power supply to provide long term secondary power supply when the primary power supply is inoperable or is disconnected. According to another exemplary embodiment, the seat system 20 may include one or more than one capacitor to store energy to provide a short term secondary power supply when the primary power supply is inoperable or is disconnected. A seat system 20 also may be configured to include both a short term backup power supply, such as a capacitor, and a long term backup power supply, such as a battery.

The seat system 20 may further include a second sensing mechanism configured to detect whether the seat system 20 is in one of two seat positions, then output a second signal to communicate to the ECU 40 the position of seat system 20. The first position of seat system 20 is the occupied position, where an occupant is seated on the seat cushion 21 of the seat system 20. The second position of the seat system 20 is the unoccupied position, where the seat cushion 21 is not supporting an occupant. The second sensing mechanism outputs a second signal to the ECU 40 providing information as to whether the seat is occupied by an occupant. According to an exemplary embodiment, second sensing mechanism is coupled to the ECU 40 by a direct line of communication. According to another exemplary embodiment, second sensing mechanism communicates with the ECU 40 through a wireless communication method.

The seat system 20 may further include a third sensing mechanism configured to determine the weight of the occupant seated on the seat cushion 21 of seat system 20. According to an exemplary embodiment, third sensing mechanism may stand alone as a separate sensor to communicate with ECU 40. According to another exemplary embodiment, third sensing mechanism may be incorporated with second sensing mechanism, so that one sensing device detects whether the seat is occupied and if occupied, determines what the weight of the seat occupant is. Third sensing mechanism may communicate through a direct coupled line or through wireless connection communication methods with the ECU 40.

The seat system 20 may further include a fourth sensing mechanism to detect the position (or location) and size of the occupant. Fourth sensing mechanism may communicate through a direct coupled line or through wireless connection communication methods with the ECU 40. The fourth sensing mechanism may be used in conjunction with other sensors to assist the ECU 40 in determining whether an object seated on the seat system 20 is an occupant or is an inanimate object, such as a hand bag or purse. The fourth sensing mechanism may provide a signal that allows the ECU 40 to determine that the seat is not occupied by a passenger and, therefore, communicate the proper status of the seat system to the driver of the mass transit vehicle. Seat systems configured to include multiple sensors may provide for more detailed and more reliable data as to whether a seat occupant is seated without using the seat belt.

Seat system 20 may further include a fifth sensing mechanism to detect occupant motion or kinematics. Fifth sensing mechanism may communicate through a direct coupled line or through wireless connection communication methods with the ECU 40. The fifth sensing mechanism may be used to detect and track the kinematics of the occupant during a vehicle dynamic impact event, then communicate through a direct coupled line or through wireless connection communication methods with the ECU 40 the occupant kinematic data. The memory device 42 may record the occupant motion data processed by the microprocessor 41 of ECU 40, so that safety officials, engineers, or others may use the occupant kinematic data for purposes of improving occupant safety.

Seat system 20 may further include a sixth sensing mechanism to identify the seat occupant through a preset identification method. This sensor could identify an occupant by a card or other device that communicates with the sensor based on proximity to the sensor. The sixth sensing mechanism provides a useful and efficient way of tracking children when incorporated into a school bus application. For example, sixth sensing mechanism may be used to track children when they enter and leave the school bus. The school bus could further include a global positioning system (GPS) to allow for the bus to track entrance and exit of specific children having a preset identification method relative to the school bus location. This application would improve safety for school children by having tracking their points of entrance and exit.

Seat system 20 may further include a seventh sensing mechanism to detect the inertial properties of the seat system. Seventh sensing mechanism may be in communication with the ECU 40 through a direct coupled line or through a wireless connection communication method and may include any combination of accelerometers and/or gyroscopes to determine the inertial properties of the seat system, such as the sudden deceleration caused by a vehicle dynamic vehicle impact event, then may communicate to and/or activate other occupant protection devices, such as reversible and non-reversible individual restraints, bolsters, or airbags. For example, during a dynamic impact event of the vehicle, the seventh inertial sensing mechanism may communicate to the ECU, which in turn communicates to and activates a pretensioner incorporated in the seat belt device and may further activate one or more than one airbag to provide increased occupant protection. The seat systems disclosed herein may include further sensor mechanisms, which may communicate to the ECU of the seat system and/or may communicate to other ECUs within the vehicle. Furthermore, the seating system may include one or more of the aforementioned sensing systems depending on the desired information to be communicated to the driver and to the other vehicle systems, such as, for example, occupant restraint or vehicle safety systems.

According to an exemplary embodiment, ECU 40 of seat system 20 may further include a programmable memory having an input connection 45 allowing for the ECU 40 to be updated with improvements or additions. The reprogramming input connection may be visible and accessible from external the seat system or may be configured to be hidden, such as within or underneath the seat system, to try to limit access to the input connection. The input connection may allow for a direct wire connection through any communication protocol, or input connection may allow for a wireless connection through any communication protocol.

The seat system 20 or the ECU 40 may further include input and/or output connections that transfer analog or digital signals into or out of the seat system or ECU. These analog or digital signals may be used to communicate with electronic devices, such as infotainment devices, that may be integrated in the seat or may be configured external to the seat. For example, a seat may have an output connection to transmit the sound signal from a television or DVD player located in the mass transit vehicle, where the seat occupant may be able to plug in head-phones to listen to the sound signal. The seat systems and electromechanical devices disclosed herein are not limited to this example, and those skilled in the art will recognize that the analog and/or digital signal input/output connections may be used for any such purpose.

Figure 2:
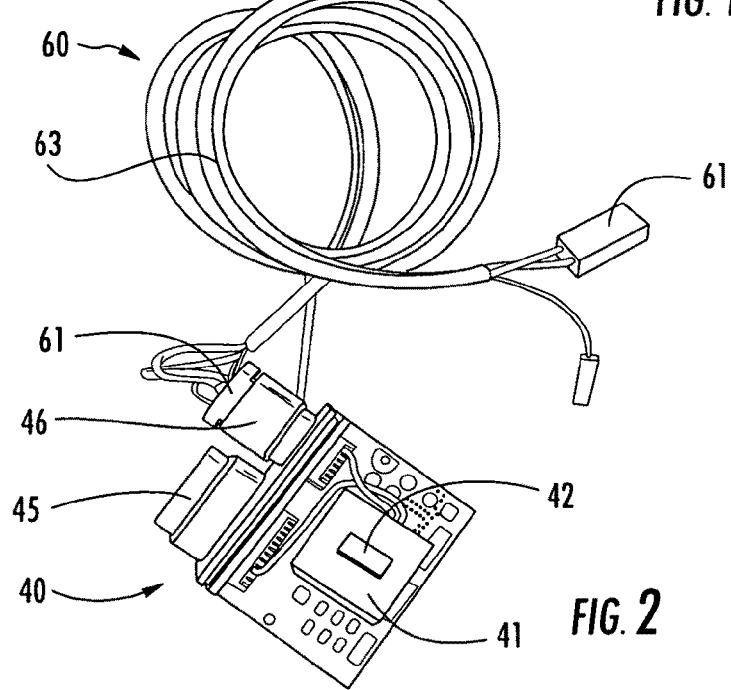
FIG. 2 is an exemplary embodiment of an electromechanical device for use in a seat assembly, such as the seat assembly of FIG. 1.

Referring to FIG. 2, the ECU 40 is illustrated according to an exemplary embodiment and includes a microprocessor 41, a memory device 42, an input connection 45, and an output connection 46. As disclosed herein, the ECU 40 may include one or more than one input connection 45 to provide input voltage or power to the ECU or to provide input communication from other electrical devices. Also disclosed herein, the ECU 40 may include one or more than one output connection 46 to provide output voltage (or power) and/or communication to other electrical devices. As shown in FIG. 2, power and/or communication may be communicated or transmitted through a wire harness 60, which includes at least one connection 61 and a cable 63. A cable 63 may include any number of wires capable of conducting power or communication between the ECU and at least one electrical device in the vehicle.

Referring to FIG. 3, an exemplary embodiment of a cover assembly 70 is illustrated and includes a first cover member 73 and a second cover member 75. First and second cover members 73, 75 may be made of polymer or any other useful material that provides relative toughness or impact resistance. According to an exemplary embodiment, first and second cover members 73, 75 may be used together to cover the ECU 40 to prevent damage (e.g., impact, environmental, liquids) of the ECU 40 during use. First and second cover members 73, 75 may include mechanisms (e.g., snaps, hooks, slots, etc. . . . ) that allow for coupling of the cover members to the ECU 40. First and second cover members 73, 75 may further include attachment mechanisms 77 that allow for the coupling of the cover assembly 70 to the seat system 20. Attachment mechanism 77 may be a tab or ear having an aperture for a fastener to engage, or may be any other conventional configuration. Therefore, cover assembly 70 may be used to couple the ECU 40 to the seat system 20 and may also be used to protect ECU 40 once coupled to the cover assembly 70.

Figure 5:
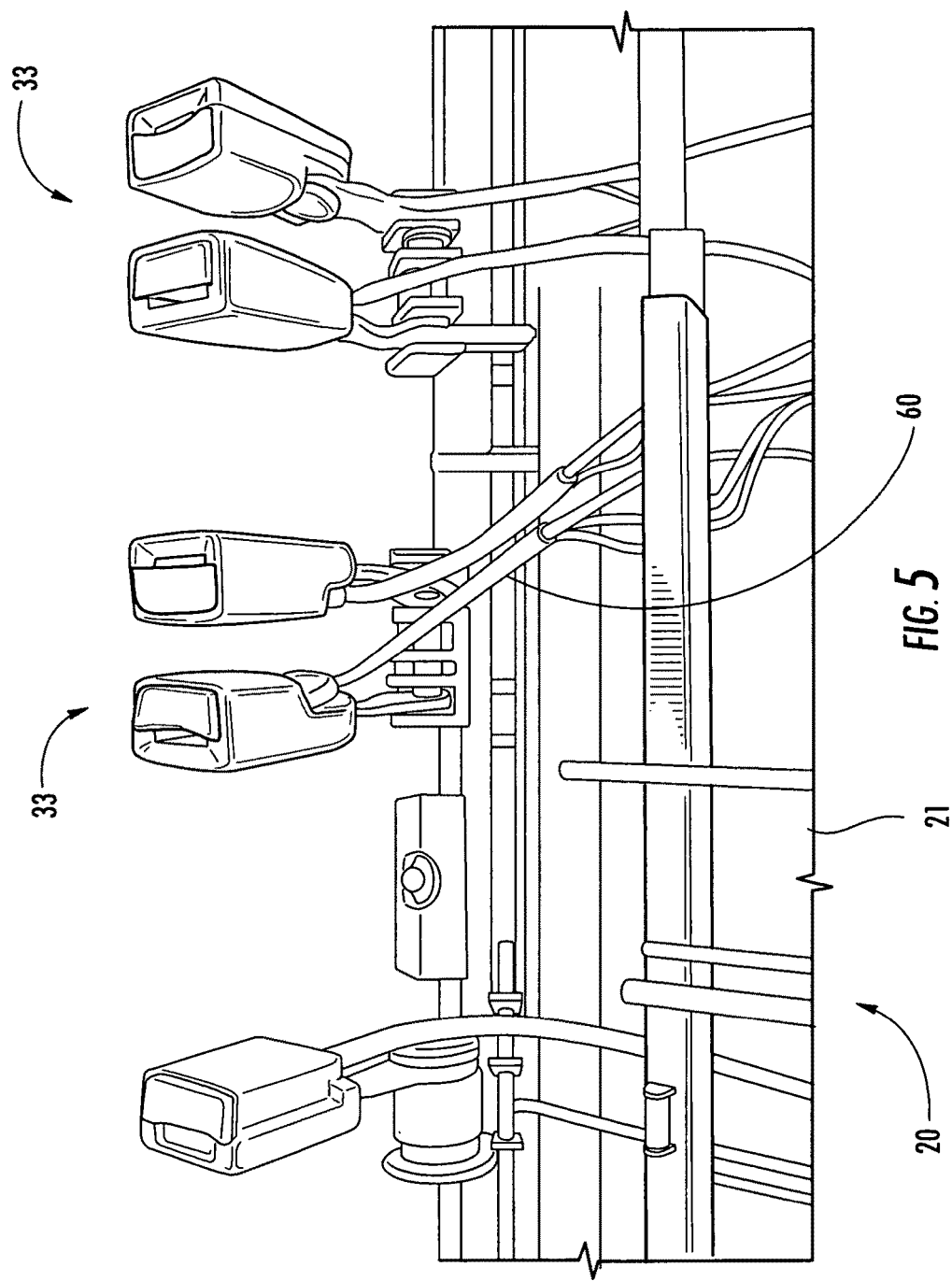
FIG. 5 is a perspective view of a buckle assembly incorporated into a portion of the seat assembly and coupled to an electromechanical device.

Referring to FIGS. 4 and 5, portions of the seat cushion 21 of seat system 20 are illustrated. As shown in FIG. 4, the ECU 40 may be coupled to the bottom side of the cushion pan of seat cushion 21 by means of a cover assembly 70. Wiring harness 60 may be coupled at a first end to ECU 40 and at a second end to buckle mechanism 33 (as shown in FIG. 5), where power is delivered to buckle mechanism 33 from ECU 40 and communication is communicated through wiring harness 60. The power and communication provided through wiring harness 60 may provide for operation of the first sensing mechanism.

A vehicle (e.g., mass transit vehicle) may be configured to include a plurality of seat systems, each being configured to include an ECU. Each ECU may be a common ECU configured with a common connector to couple to the wiring harness to communicate with the vehicle (e.g., the control module of vehicle). The wiring harness may include a specific jumper wire for each ECU to connect to, where upon coupling of the ECU to the wiring harness, the vehicle may communicate through the wiring harness to each ECU. The ECU may then communicate common and/or independent information (e.g., sensor information, functional information, vehicle safety information) with the vehicle, based on the position of the ECU within the vehicle. Thus, the vehicle and each ECU recognize the position of each ECU within the vehicle, which allows for selective communication between one or more than one ECU and the vehicle. A mass transit vehicle configured to include a plurality of seat systems, each having a common ECU, reduces cost and improves manufacturability.

The electromechanical or electronic devices disclosed herein may be configured to be hidden within the seat system and protected in the seat to provide an aesthetic seat system and comfortable seat system. The devices (e.g., ECU) disclosed herein provide for a central location for power, control, and communication within a seat system. The devices disclosed herein further provide for power and signal conditioning of current and future functions within a seat system with the opportunity to be improved or modified by being reprogrammable. The devices disclosed herein further provide a single interface for sensors, actuators, and data exchange with wired devices in the seat and wireless devices brought into proximity with the seat. By incorporating the disclosed functionality, these electromechanical devices provide a relative low cost and an efficient means of supporting current applications and future applications.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the seat systems and electromechanical devices as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention

What is claimed is:

1. A seat system for a mass transit vehicle configured to provide at least one seating position, comprising:
    a seat cushion configured to support at least one occupant;
    a seat back configured to support at least one occupant;
    one seat belt device for each seating position configured to provide restraint to an occupant;
    wherein each seat belt device includes a webbing, a buckle mechanism, a tongue mechanism configured to detachably couple to the buckle mechanism, and a first sensing mechanism configured to detect and output a first signal indicating whether the seat belt device is configured in one of a first unbuckled position and a second buckled position;
    an electronic control unit having at least one input connection, at least one output connection, a microprocessor configured to process data received through the at least one input connection, and a memory device configured to store the data processed by the microprocessor;
    wherein the electronic control unit is coupled to a vehicle voltage source;
    at least one communication device coupled to the electronic control unit and configured to communicate externally to the seat system; and
    a second sensing mechanism configured to determine whether the seat is configured in one of a first unoccupied position and a second occupied position;
    wherein the second sensing mechanism outputs a second signal representative of the one of the first unoccupied position and the second occupied position;
    wherein the microprocessor is configured to monitor the first and second signals; and
    wherein the memory device is configured to record the first and second signals.

2. The seat system of claim 1, further comprising a third sensing mechanism configured to determine a weight of the occupant when the second sensing mechanism determines the seat to be in the second occupied position, wherein the third sensing mechanism outputs a third signal representative of the weight of the occupant.

3. The seat system of claim 2, wherein the microprocessor of the electronic control unit is configured to monitor the third signal from the third sensing mechanism and wherein the memory device of the electronic control unit is configured to record the third signal from the third sensing mechanism.

4. The seat system of claim 1, further comprising a fourth sensing mechanism configured to detect a position and size of the occupant, wherein the fourth sensing mechanism outputs a fourth signal representative of the position and size of the occupant.

5. The seat system of claim 4, wherein the microprocessor of the electronic control unit is configured to monitor the fourth signal from the fourth sensing mechanism and wherein the memory device of the electronic control unit is configured to record the fourth signal from the fourth sensing mechanism.

6. The seat system of claim 1, further comprising a fifth sensing mechanism configured to detect a motion of the occupant, wherein the fifth sensing mechanism outputs a fifth signal representative of the motion of the occupant.

7. The seat system of claim 6, wherein the microprocessor of the electronic control unit is configured to monitor the fifth signal from the fifth sensing mechanism and wherein the memory device of the electronic control unit is configured to record the fifth signal from the fifth sensing mechanism.

8. The seat system of claim 1, further comprising a sixth sensing mechanism configured to detect an identification of the occupant, wherein the sixth sensing mechanism outputs a sixth signal representative of the identification of the occupant.

9. The seat system of claim 8, wherein the microprocessor of the electronic control unit is configured to monitor the sixth signal from the sixth sensing mechanism and wherein the memory device of the electronic control unit is configured to record the sixth signal from the sixth sensing mechanism.

10. The seat system of claim 1, further comprising a seventh sensing mechanism configured to detect an inertia of the seat system, wherein the seventh sensing mechanism outputs a seventh signal representative of the inertia of the seat system.

11. The seat system of claim 10, wherein the microprocessor of the electronic control unit is configured to monitor the seventh signal from the seventh sensing mechanism and wherein the memory device of the electronic control unit is configured to record the seventh signal from the seventh sensing mechanism.

12. The seat system of claim 1, further comprising a backup voltage source configured to supply voltage when the vehicle voltage source is not operable.

13. The seat system of claim 12, wherein the backup voltage source includes a battery.

14. The seat system of claim 12, wherein the backup voltage source includes at least one capacitor configured to store energy.

15. The seat system of claim 1, wherein the communication device includes a directly connected communication protocol.

16. The seat system of claim 1, wherein the communication device includes a wireless communication protocol.

17. The seat system of claim 1, wherein the input connection communicates with another vehicle electronic device.

18. The seat system of claim 1, wherein the output connection communicates with another vehicle electronic device.

19. The seat system of claim 1, wherein the output connection provides audio connection to the seat occupant.

20. The seat system of claim 1, wherein the output connection provides video connection to the seat occupant.

21. The seat system of claim 1, wherein the seat belt device further includes a lighting element configured to provide light.

22. The seat system of claim 21, wherein the lighting element is an electroluminescent light configured to provide light when external lights of the vehicle are illuminated.

23. The seat system of claim 21, wherein the lighting element is an electroluminescent light configured to provide light when the tongue mechanism and the buckle mechanism are uncoupled.

24. The seat system of claim 1, wherein the seat belt device further includes an active release mechanism configured to allow for remote uncoupling of the tongue mechanism and the buckle mechanism.

25. The seat system of claim 1, further comprising a cover assembly configured to protect the electronic control unit from damage, wherein the cover assembly includes first and second cover members having coupling mechanisms to allow for coupling of the electronic control unit and to allow for coupling of the first cover member to the second cover member.

26. A seat system for a mass transit vehicle configured to provide at least one seating position, comprising:
a seat cushion configured to support at least one occupant;
a seat back configured to support at least one occupant;
one seat belt device for each seating position configured to provide restraint to an occupant;
wherein each seat belt device includes a webbing, a buckle mechanism, a tongue mechanism configured to detachably couple to the buckle mechanism, and a first sensing mechanism configured to detect and output a first signal indicating whether the seat belt device is configured in one of a first unbuckled position and a second buckled position; and
an electronic control unit having at least one input connection to communicate with another electrical device, at least one output connection to communicate with another electrical device, a microprocessor to process data received through the input connection, and a memory device to store the data processed by the microprocessor,
wherein the microprocessor is configured to monitor the first signal; and
wherein the memory device is configured to record the first signal.

27. The seat system of claim 26, wherein the electronic control unit is coupled to a vehicle voltage source.

28. The seat system of claim 26, further comprising at least one communication device configured to wirelessly communicate with another electrical device.

29. The seat system of claim 26, further comprising a second sensing mechanism to determine whether the seat is configured in one of a first unoccupied position and a second occupied position, wherein the second sensing mechanism outputs a second signal representative of the one of the first unoccupied position and the second occupied position;
wherein the microprocessor is configured to monitor the second signal; and wherein the memory device is configured to record the second signal.

* * * * *